United States Patent
Chavan et al.

(10) Patent No.: US 11,294,816 B2
(45) Date of Patent: Apr. 5, 2022

(54) EVALUATING SQL EXPRESSIONS ON DICTIONARY ENCODED VECTORS

(71) Applicant: Oracle International Corporation, Redwood Shores, CA (US)

(72) Inventors: Shasank K. Chavan, Menlo Park, CA (US); Dina Thomas, Palo Alto, CA (US); Ajit Mylavarapu, Mountain View, CA (US); Prashant Gaharwar, San Mateo, CA (US); Dennis Lui, San Jose, CA (US); Sheldon A. K. Lewis, Jalisco (MX)

(73) Assignee: Oracle International Corporation, Redwood Shores, CA (US)

( * ) Notice: Subject to any disclaimer, the term of this patent is extended or adjusted under 35 U.S.C. 154(b) by 919 days.

(21) Appl. No.: 15/397,714

(22) Filed: Jan. 3, 2017

(65) Prior Publication Data

US 2017/0116242 A1 Apr. 27, 2017

Related U.S. Application Data

(63) Continuation-in-part of application No. 15/294,460, filed on Oct. 14, 2016.
(Continued)

(51) Int. Cl.
*G06F 12/0875* (2016.01)
*G06F 16/2452* (2019.01)
*G06F 7/24* (2006.01)

(52) U.S. Cl.
CPC ............ *G06F 12/0875* (2013.01); *G06F 7/24* (2013.01); *G06F 16/2452* (2019.01); *G06F 2212/60* (2013.01)

(58) Field of Classification Search
None
See application file for complete search history.

(56) References Cited

U.S. PATENT DOCUMENTS 6,965,968 B1 * 11/2005 Touboul .............. G06F 16/9574
711/118
2001/0000536 A1 4/2001 Tarin
(Continued)

OTHER PUBLICATIONS

Chavan, U.S. Appl. No. 15/294,460, filed Oct. 14, 2016, Office Action, dated Jun. 12, 2019.
(Continued)

*Primary Examiner* — Yu Zhao
(74) *Attorney, Agent, or Firm* — Hickman Becker Bingham Ledesma LLP

(57) ABSTRACT

Techniques are described herein for reducing the number of redundant evaluations that occur when an expression is evaluated against an encoded column vector by caching results of expression evaluations. When executing a query that includes an expression that references columns for which dictionary-encoded column vectors exist, the database server performs a cost-based analysis to determine which expressions (or sub-expressions) would benefit from caching the expression's evaluation result. For each such expression, the database server performs the necessary computations and caches the results for each of the possible distinct input values. When evaluating an expression for a row with a particular set of input codes, a look-up is performed based on the input code combination to retrieve the pre-computed results of that evaluation from the cache.

24 Claims, 9 Drawing Sheets

Related U.S. Application Data

(60) Provisional application No. 62/393,780, filed on Sep. 13, 2016, provisional application No. 62/245,952, filed on Oct. 23, 2015, provisional application No. 62/245,948, filed on Oct. 23, 2015, provisional application No. 62/242,119, filed on Oct. 15, 2015.

(56) References Cited

U.S. PATENT DOCUMENTS

| | | |
|---|---|---|
| 2003/0028509 A1 | 2/2003 | Sah |
| 2003/0088537 A1 | 5/2003 | Ko |
| 2003/0187858 A1* | 10/2003 | Kirk .................. G06F 16/24545 |
| 2005/0216465 A1* | 9/2005 | Dutta .................. G06F 21/6227 |
| 2010/0049730 A1* | 2/2010 | Qiao .................. G06F 16/24539 |
| | | 707/756 |
| 2010/0328115 A1* | 12/2010 | Binnig .............. G06F 16/24561 |
| | | 341/51 |
| 2012/0117064 A1 | 5/2012 | Draese |
| 2013/0103654 A1 | 4/2013 | McLachlan |
| 2013/0232176 A1 | 9/2013 | Plattner |
| 2014/0122452 A1 | 5/2014 | Faerber |
| 2015/0052150 A1* | 2/2015 | Sharique ............. G06F 16/2255 |
| | | 707/747 |
| 2015/0178305 A1* | 6/2015 | Mueller ................ G06F 16/221 |
| | | 707/693 |
| 2015/0324373 A1 | 11/2015 | Tyercha |
| 2017/0024435 A1 | 1/2017 | Kociubes et al. |
| 2017/0109406 A1 | 4/2017 | Chavan |

OTHER PUBLICATIONS

Chavan, U.S. Appl. No. 15/294,460, filed Oct. 14, 2016, Interview Summary, dated Jul. 29, 2019.
Bernet, "Dictionary Compression for a Scan-Based, Main-Memory Database System", dated 2010, 89 pages.
Amazon, "Database Developer Guide", dated Dec. 1, 2012, 2 pages.
Chavan, U.S. Appl. No. 15/294,460, filed Oct. 14, 2016, Notice of Allowance, dated Mar. 18, 2020.
Chavan, U.S. Appl. No. 15/294,460, filed Oct. 14, 2016, Advisory Action, dated Feb. 3, 2020.
Oracle, "Oracle Database In-Memory", dated Aug. 2014, 29 pages.
Chavan, U.S. Appl. No. 15/294,460, filed Oct. 14, 2016, Final Office Action, dated Oct. 21, 2019.

* cited by examiner

| DICTIONARY 106a | |
|---|---|
| CODE | STATE |
| 1 | CA |
| 2 | IL |
| 3 | NV |
| 4 | WI |

ENCODED COLUMN VECTOR 104

| |
|---|
| 1 |
| 4 |
| 4 |
| 2 |
| 1 |
| 3 |
| 1 |

COLUMN VECTOR 102

| |
|---|
| CA |
| WI |
| WI |
| IL |
| CA |
| NV |
| CA |

TABLE 100

| STATE | REGION |
|---|---|
| CA | 1 |
| WI | 7 |
| WI | 7 |
| IL | 3 |
| CA | 1 |
| NV | 1 |
| CA | 1 |
| ... | ... |

FIG. 1

DICTIONARY 106c

| CODE | STATE |
|------|-------|
| 1 | CA |
| 2 | IL |
| 3 | NV |
| 4 | WI |
| 5 | AK |
| 6 | GA |
| 7 | AL |
| 8 | AR |
| 9 | CO |
| 10 | MT |
| 11 | NH |
| 12 | NJ |
| 13 | SD |
| 14 | TX |
| 15 | CT |
| 16 | DE |
| 17 | HI |
| 18 | KS |
| 19 | WV |
| 20 | MN |
| 21 | OH |
| 22 | WY |

SORT ORDER BOUNDARY 116

S.O. BOUNDARY 302

S.O. BOUNDARY 304

S.O. BOUNDARY 306

S.O. BOUNDARY 308

FIG. 3

VERSION 1  
DICTIONARY 106c

| CODE | STATE |
|---|---|
| 1 | CA |
| 2 | IL |
| 3 | NV |
| 4 | WI |
| 5 | AK |
| 6 | GA |
| 7 | AL |
| 8 | AR |
| 9 | CO |
| 10 | MT |
| 11 | NH |
| 12 | NJ |
| 13 | SD |
| 14 | TX |
| 15 | CT |
| 16 | DE |
| 17 | HI |
| 18 | KS |
| 19 | WV |
| 20 | MN |
| 21 | OH |
| 22 | WY |

VERSION 2  
DICTIONARY 106d

| CODE | STATE |
|---|---|
| 1 | AK |
| 2 | AL |
| 3 | AR |
| 4 | CA |
| 5 | CO |
| 6 | CT |
| 7 | DE |
| 8 | GA |
| 9 | HI |
| 10 | IL |
| 11 | KS |
| 12 | MN |
| 13 | MT |
| 14 | NH |
| 15 | NJ |
| 16 | NV |
| 17 | OH |
| 18 | SD |
| 19 | TX |
| 20 | WI |
| 21 | WV |
| 22 | WY |

EVALUATING SQL EXPRESSIONS ON DICTIONARY ENCODED VECTORS

CROSS-REFERENCE TO RELATED APPLICATIONS; BENEFIT CLAIM

This application is a continuation-in-part of U.S. patent application Ser. No. 15/294,460, filed on Oct. 14, 2016, which, in turn, claims the benefit of:
  Provisional Appln. 62/242,119, filed Oct. 15, 2015,
  Provisional Appln. 62/245,952, filed Oct. 23, 2015,
  Provisional Appln. 62/245,948, filed Oct. 23, 2015, and
  Provisional Appln. 62/393,780, filed Sep. 13, 2016;
the entire contents of U.S. patent application Ser. No. 15/294,460 and each of the provisional applications cited above are hereby incorporated by reference as if fully set forth herein.

FIELD OF THE INVENTION

The present invention relates to evaluating SQL expressions and, more specifically, to evaluating SQL expressions using dictionary encoded column vectors.

BACKGROUND

Database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be pre-loaded into volatile memory. Various approaches for loading entire database objects, or selected portions thereof, into volatile memory to speed up database operation processing are described in U.S. Pat. No. 9,292,564, entitled "Mirroring, In Memory, Data From Disk To Improve Database operation Performance", the application for which was filed Jul. 21, 2014, referred to herein as the "Mirroring" application, the contents of which are incorporated herein in their entirety.

According to the approaches described in the Mirroring application, database objects, or portions thereof, are stored in volatile memory in a different format than the format that those same objects have on disk. For example, the in-memory copies of the objects may be stored in a column-major format, while the on-disk copies are stored in a row-major format. The format used by the on-disk copies is referred to as the "persistent format", while the format used by the in-memory copies is referred to as the "mirror format". An in-memory version or copy of an object (or selected portions thereof), is referred to herein as an In-Memory Columnar Unit (IMCU).

To reduce the amount of volatile memory consumed by IMCUs, the mirror format is often compressed. One way to compress an IMCU is through the use of dictionary encoding. For example, assume that an IMCU stores a contiguous array of values from a column c1 of a table T1. Such an array is referred to herein as a "column vector". To reduce the volatile memory required to store such a column vector, the actual values from the table may, within the column vector, be replaced with values that take less space ("codes"). For example, a character string of 30 characters may be replaced by a four-byte code. The column vector produced by making such replacements is significantly smaller than a column vector that contains the original values.

While dictionary encoding significantly reduces the size of column vectors, it is necessary, when processing database commands based on information from the column vectors, to be able to reproduce the actual values of the column. Therefore, a dictionary is maintained in conjunction with a column vector. The dictionary associated with a column vector contains a replacement-value-to-actual-value mapping for each unique value in the original set of values. For example, assume that column c1 stores the names of states, and that table T1 has one million rows. The dictionary for the compressed column vector for c1 would have one entry for each unique state name that is present in c1. Since there are only 50 states, the dictionary for the compressed column vector for c1 would have at most 50 entries.

The process of encoding a column vector typically involves (a) reading the actual values from the target column, (b) eliminating duplicates to create a list of unique values, (c) and (d) assigning a code to each unique value. Once a code has been assigned to each unique value, the values within a column vector are replaced with the corresponding codes. Because the codes are smaller than the values the codes replace, the column vectors that contain the codes are effectively "compressed".

Decompressing a compressed column is referred to as "materializing" the column. Decompressing a column vector that was compressed using dictionary encoding involves performing code-to-value look-ups using the dictionary by which the column vector was encoded. To speed up code-to-value look-up operations, the position of the unique value's entry in the dictionary may be treated as the code for that unique value. For example, the value associated with the first dictionary entry may be assigned a code of "1", the value associated with the second dictionary entry may be assigned a code of "2", etc. To illustrate how assigning codes that correspond to the entry positions within the dictionary reduces the time required for code-to-value look-up operations, assume that the database server needs to determine the value that corresponds to the code "7". To determine the value, the database server can simply use "7" as an index into the dictionary to locate the seventh dictionary entry. The 7th dictionary entry contains the actual value, from c1, that corresponds to the code "7".

To speed up value-to-code look-up operations, the values are stored in the dictionary in sorted order. By storing the values in the dictionary in sorted order, the code for a target value may be ascertained by performing a binary search on the dictionary. Upon finding the target value within an entry in the dictionary, the database server simply uses the position, within the dictionary, of the entry that has the target value, as the code for the target value. Thus, if the binary search finds target value in the $7^{th}$ entry of the dictionary, then the code for the target value is "7".

Unfortunately, it is often impractical to have a single column vector for a column. For example, if column c1 has several million rows, even the compressed column vector for the column may be too large to be efficiently stored in a single IMCU. Therefore, it is common for one column of a table to be divided up into multiple column vectors, each of which covers a range of rows from the actual table. For example, assume that column c1 has 3000 rows. Column c1 may be mirrored in volatile memory using three column vectors CV1, CV2 and CV3, where CV1 covers the values of c1 from row 1 to row 1000, CV2 covers values of c1 from row 1001 to row 2000, and CV3 covers values of c1 from row 2001 to row 3000. Each of these column vectors may be stored, within the volatile memory of the same node, in separate IMCUs. For the purpose of explanation, it shall be assumed that the IMCUs to which column vectors CV1, CV2 and CV3 belong are IMCU1, IMCU2, and IMCU3, respectively.

In the scenario described above, because each of column vectors CV1, CV2 and CV3 is in a separate IMCU, each of column vectors would be encoded using a different dictionary. For the purpose of explanation, the dictionary used to encode column vectors CV1, CV2 and CV3 shall be referred to as DCT1, DCT2 and DCT3, respectively. DCT1, DCT2, and DCT3 are IMCU-specific. Specifically, the dictionaries are not interchangeable because, for example, column c1 of rows 1-1000 (CV1) may have some values that column c1 of rows 1001-2000 (CV2) does not have, and visa-versa. Thus, DCT1 would have entries for values for which DCT2 would not have entries, and visa-versa. Further, even for the values that are common to both CV1 and CV2, the codes to which those common values are mapped may be different. For example, DCT1 may map "California" to code "2", while DCT2 maps "California" to code "4".

Often, database commands require processing all rows of a table based on values in a specified column, not simply those rows that belong to a single column vector. For example, a query may have the predicate "where c1='California' or 'Maine'". When processing such commands, the database server creates various temporary data structures based on the mappings in DCT1 to apply the predicate "where c1='California' or 'Maine'" to the values in CV1. Then, those temporary data structures are discarded, and new temporary data structures are created based on the mappings in DCT2 to apply the predicate "where c1='California' or 'Maine'" to values in CV2. Finally, those temporary data structures are discarded, and new temporary data structures are created based on the mappings in DCT3 to apply the predicate "where c1='California' or 'Maine'" to values in CV3.

Not only is the rebuilding of those temporary data structures time consuming, but the dictionaries themselves may be highly redundant. For example, DCT1, DCT2 and DCT3 may each have entries for all or nearly all of the 50 states. The redundant storage of the same values (which can be quite large) in multiple dictionaries can consume a significant amount of volatile memory. For example, a significant amount of memory would be consumed by five IMCU-specific dictionaries, where each of the five IMCU-specific dictionaries established a different mapping for nearly the same set of one million large unique values.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram showing a dictionary encoded column vector;

FIG. 3 is a block diagram showing a global dictionary with several sort order sets, according to an embodiment;

FIG. 4 is a block diagram showing multiple versions of a global dictionary, each of which may be used to encode multiple column vectors, according to an embodiment;

DETAILED DESCRIPTION

Figure 2:
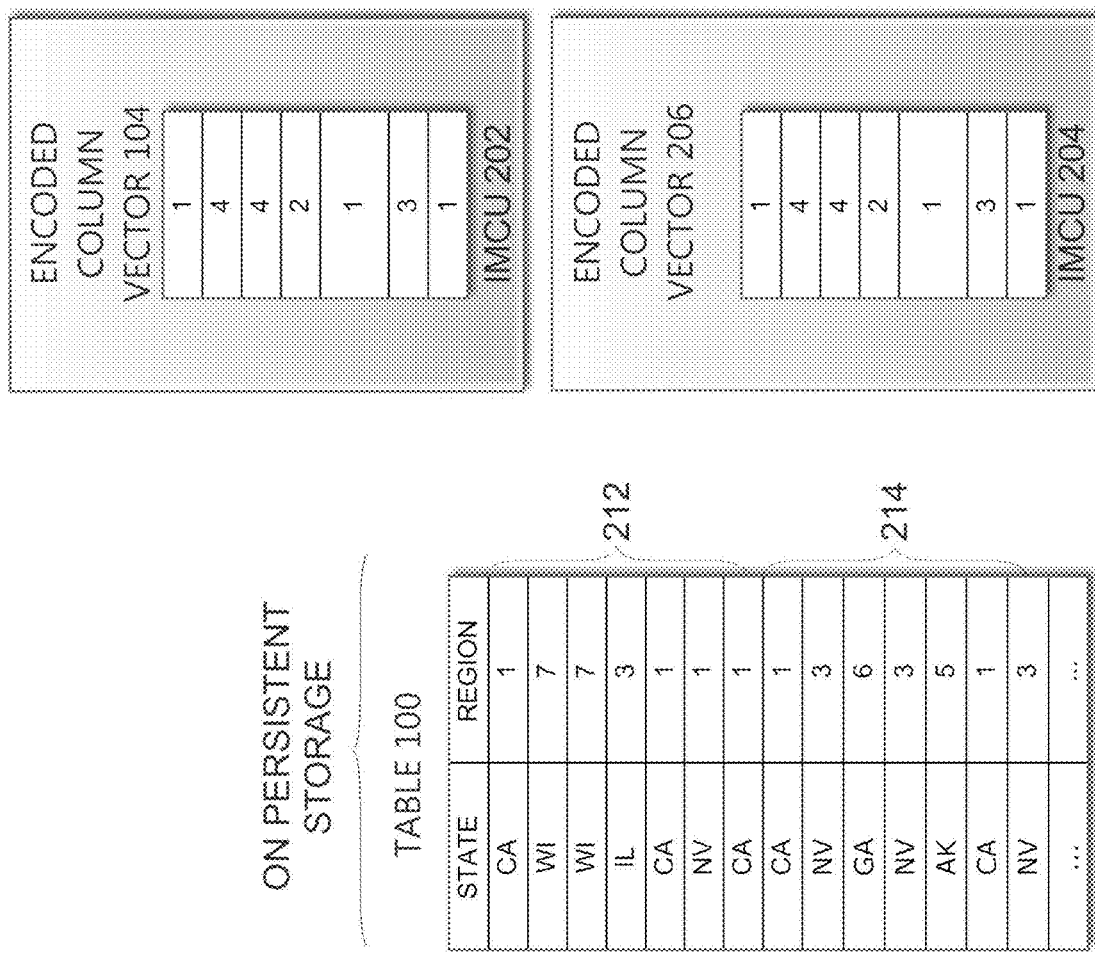
FIG. 2 is a block diagram showing a global dictionary, containing two sort order sets, used to encode multiple column vectors, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for sharing a dictionary across multiple IMCUs. According to one embodiment, after a dictionary is used to encode a first column vector in a first IMCU, the same dictionary is used to encode a second column vector in a second IMCU. As mentioned above, the entries in the dictionary are in sort order to facilitate binary searching when performing value-to-code look-ups. If, during the encoding of the second column vector, values are encountered for which the dictionary does not already have codes, then a "sort-order-boundary" is established after the last entry in the dictionary, and entries for the newly encountered values are added to the dictionary after the sort-order-boundary. To facilitate value-to-code look-ups, the new entries are also sorted relative to each other. Consequently, after the new entries are added, performing a value-to-code look-up for a target value involves (a) performing a binary search among the original entries and, if an entry for the target value is not found among the original entries, then (b) performing a binary search among the new entries.

The same dictionary may then be used to encode additional column vectors. Any column vector that has one or more new values to add to the dictionary establishes an additional sort-order-boundary, and adds new entries after the new sort-order-boundary. Because each sort-order-boundary means that an additional binary search may need to be performed during value-to-code look-ups, it may be desirable to establish a maximum number of sort-order-boundaries a dictionary may have.

Once a dictionary has reached the maximum number of sort-order-boundaries, newly-encountered values cause a new version of the dictionary to be created. In the new version of the dictionary, all entries are sorted relative to each other, so each value-to-code look-up using the new version of the dictionary initially requires a single binary search. Once a new version of a dictionary is created, subsequent column vector encoding operations use the new version (until it also reaches the maximum number of sort order boundaries). The newest version of a dictionary is also used when column vectors are encoded during all IMCU refresh operations, when IMCUs are repopulated with current data.

By using a single dictionary to encode the column vectors of multiple IMCUs, the redundant storage of values within dictionaries is reduced. For example, a single dictionary with one million unique values may be used for five IMCUs, rather than each of the five IMCUs having its own dictionary of one million values. In addition, the temporary data structures that are created based on the single shared dictionary may be used to evaluate a predicate against the values from multiple IMCUs. Such temporary data structures may include, for example, an inverted index on symbols to their location in specific column vectors to quickly prune column vectors without that symbol, or a bloom filter on the global dictionary to quickly tell if a symbol is not present at all. Thus, the need to discard such structures every time a predicate needs to be applied to values from a different IMCU is avoided.

Database Systems

Embodiments of the present invention are used in the context of database management systems (DBMSs). Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Example Encoded Column Vector

Referring to FIG. 1, it illustrates a table 100 that shall be referred to hereafter for the purpose of explanation. Table 100 includes two columns, a "state" column and a "region" column. Column vector 102 is a column vector containing values from the first seven rows of the "state" column of table 100. Encoded column vector 104 is a compressed version of column vector 102. Specifically, encoded column vector 104 is a compressed column vector formed by replacing the state names in column vector 102 with smaller codes. The code-to-name mappings used to create the encoded column vector 104 are shown in dictionary 106a.

Dictionary 106a is illustrated as having two columns, a code column and a state column. However, in practice, the code column may be implicit. Specifically, the code for an entry in dictionary 106a is implicitly indicated by the position of the entry within dictionary 106a. Thus, the state name in the first entry of dictionary 106a implicitly maps to 1, the state name in the second entry of dictionary 106a implicitly maps to 2, etc.

As mentioned above, using codes that correspond to entry positions within dictionary 106a allows for highly-efficient code-to-value look-ups. Specifically, given any code, the dictionary entry for the code can be immediately located by using the code as an index into the dictionary.

It should be noted that, within dictionary 106a, the state names are stored in sorted order. As explained above, storing the values in sorted order improves the efficiency of value-to-code look-ups because the ordering of the values enables binary searches to be performed to locate values in dictionary 106a. Once a target state name is found using a binary search, the code for the state name is determined by the position, within dictionary 106a, of the entry containing the state name.

Global Dictionary

FIG. 2 is a block diagram that illustrates how dictionary 106b may be shared between IMCUs as a global dictionary, according to one embodiment. Referring to FIG. 2, it illustrates a scenario in which encoded column vector 104 has been stored in an IMCU 202 within volatile memory of a computing device (not shown). Dictionary 106b is also stored in the volatile memory to enable fast code-to-value lookups and value-to-code lookups.

As explained above, encoded column vector 104 only encodes values of the "state" column for the first seven rows 212 of table 100. The next seven rows 214 are encoded in another encoded column vector 206 which is stored in a different IMCU 204. In practice, the numbers of rows reflected in any column vector would typically be significantly more than seven, and could reach to the millions. Thus, the examples given herein are solely for the purpose of illustration, and do not in any way limit the application of the techniques.

As illustrated in FIG. 2, dictionary 106b is "shared" between IMCUs 202 and 204 in that dictionary 106b is used to encode values from rows 212 to produce encoded column vector 104 of IMCU 202 and to encode values from rows 214 to produce encoded column vector 206 of IMCU 204. However, during the encoding of rows 214, the database server encountered two values ("GA" and "AK") for which dictionary 106a did not have codes. In response, the database server established a sort order boundary 116 within dictionary 106b, and appended two entries to dictionary 106b after the sort order boundary 116. The values in all entries within dictionary 106b prior to sort order boundary 116 are sorted relative to each other, and the values in all entries after sort order boundary 116 are sorted relative to each other, but the values before sort order boundary 116 are not sorted relative to the entries after sort order boundary 116.

By using dictionary 106b to encode the values from rows 214, rather than create a new dictionary for encoding rows 214, the database server reduces the amount of memory used to store the mappings needed to decode encoded column vectors. For example, if an entirely new dictionary were created to encode the values from rows 214, then that dictionary would, similar to dictionary 106b, have four entries (because rows 214 contain four unique state names). Two dictionaries with four entries would consume more space than one dictionary with six entries (dictionary 106b in FIG. 2). The space saving is even greater the more values a column vector has with other column vectors that share the same dictionary.

In addition to saving memory by having a consolidated shared dictionary, the fact that dictionary 106b is shared also increases the performance of database operations that make use of encoded column vectors 104 and 206. For example, the temporary data structures that are created based on dictionary 106b during the evaluation of a predicate against values from encoded column vector 104 can be continued to be used during the processing of the same predicate against values from encoded column vector 206. Thus, the need to discard and recreate such data structures when switching between operations on one encoded column vector to another is eliminated.

Sort Order Sets

A contiguous set of dictionary entries that are sorted relative to each other are referred to herein as a "sort order set". As illustrated in FIG. 1, dictionary 106a has a single sort order set. As illustrated in FIG. 2, dictionary 106b has two sort order sets, where the first sort order set is separated from the second sort order set by a sort order boundary.

The number of sort order sets within a global dictionary directly affects the performance of value-to-code look ups using the dictionary. For example, to determine the code for "GA" using dictionary 106b as illustrated in FIG. 2, the database server performs a binary search on the entries in the sort order set above sort order boundary 116, and (if "GA" is not found) a second binary search on the entries in the sort order set below sort order boundary 116. While such searches are trivial in situations where, as illustrated, the number of entries is low, such searches can consume a significant amount of time when the number of entries is high (e.g. in the millions).

A global dictionary can be shared across any number of column vectors. However, each time the dictionary is used to encode a column vector that contains any values for which the dictionary does not already have entries, a new sort order boundary is added to the dictionary, and new entries for those values are appended to the dictionary after the new sort order boundary. Those entries, which are for values that are sorted relative to each other, are not sorted relative to the rest of the dictionary, and therefore constitute a new sort order set. Thus, a global dictionary used to encode N column vectors can have up to N sort order sets, and therefore require up to N binary searches for ever value-to-code look up.

Referring to FIG. 3, it is a block diagram that illustrates dictionary 106c after dictionary 106c has been used to encode 8 column vectors. For the purpose of discussion, column vector 104 shall be referred to as CV1, and column vector 206 shall be referred to as CV2. The other six column vectors that dictionary 106c has been used to encode shall be referred to as CV3, CV4, CV5, CV6, CV7 and CV8. Of the 8 column vectors, it shall be assumed that 6 column vectors (column vectors CV1, CV2, CV3, CV5, CV7 and CV8) introduced values that were not encountered previous to their encoding. Consequently, dictionary 106c as illustrated in FIG. 3 has a sort order set for each of the six column vectors that introduced a not-previously-encountered value.

Specifically, between the start and sort order boundary 116, dictionary 106c includes entries for the values from rows 212 of table 100, which are encoded in CV1. From sort order boundary 116 to sort order boundary 302, dictionary 106c includes entries for values from rows 214, encoded for CV2, that were not already encountered in rows 212. From sort order boundary 302 to sort order boundary 304, dictionary 106c includes entries for values from a third set of rows (the rows that correspond to CV3) that were not encountered in any of the already-encoded column vectors. From sort order boundary 304 to sort order boundary 306, dictionary 106c includes entries for values from a fourth set of rows (the rows that correspond to CV5) that were not encountered in any of the already-encoded column vectors. From sort order boundary 306 to sort order boundary 308, dictionary 106c includes entries for values from a fifth set of rows (the rows that correspond to CV7) that were not encountered in any of the already-encoded column vectors. From sort order boundary 308 to the end of dictionary 106c, dictionary 106c includes entries for values from a sixth set of rows (the rows that correspond to CV8) that were not encountered in any of the already-encoded column vectors.

As mentioned above, each value-to-code look-up may require up to N binary searches, where N is the number of sort order sets in the global dictionary. At some point, the delay incurred by performing so many binary searches per value-to-code look-up can become unacceptable. To avoid having to perform an ever-increasing number of binary searches per value-to-code look up, techniques are provided for initiating a new version of the global dictionary upon the number of sort order sets reaching a threshold number. The threshold number may vary from implementation to implementation based, for example, on the configurations of the systems.

Versioned Global Dictionaries

As mentioned above, in response to the number of sort order sets within a global dictionary reaching a pre-determined maximum, the database server ceases to use the existing global dictionary to encode new column vectors, and instead begins a new version of the global dictionary. For example, assume that the maximum is set to 6. Since dictionary 106c already has six sort order sets, using dictionary 106c to encode another column vector that includes values not already present in dictionary 106c would cause another sort order set to be added to dictionary 106c. Instead, a new version of the dictionary (shown in FIG. 4 as dictionary 106d) is created. Dictionary 106d includes entries for all of the values that are in dictionary 106c. However, dictionary 106d includes no sort order boundaries because all entries within dictionary 106d are sorted relative to each other. Consequently, name-to-code look-ups using version 2 of the global dictionary (i.e. dictionary 106d) can be performed in a single binary search.

Clearly, dictionary 106d has different code-to-value mappings than dictionary 106c. Therefore, dictionary 106d cannot be used to decode any of column vectors V1-V8 that have already been encoded using dictionary 106c. To be able to continue to make use of existing encoded column vectors, the database server retains dictionary 106c in memory so long as any column vector that has been encoded using dictionary 106c remains in existence. Under normal circumstances, an encoded column vector remains in memory until discarded or repopulated.

In the example illustrated in FIG. 4, only two versions of the dictionary exist. However, there is no limit to the number of versions a dictionary may have. For example, if the values for a particular column of a table are loaded into fifty column vectors, a first version of the dictionary may reach the maximum number of sort order sets after encoding the first ten column vectors, a second version of the dictionary may reach the maximum number of sort order sets after encoding the next twenty column vectors, and a third version of the dictionary may still be under the maximum number of sort order sets after encoding the final twenty column vectors.

Discarding Unused Versions of a Dictionary

As mentioned above, it is desirable to retain non-current versions of a dictionary in memory so long as any column vector that has been encoded using those versions remains in existence. When any column vector is repopulated, the column vector is rebuilt based on the current values within the rows to which the column vector corresponds. When the rebuilt column vector is compressed, the database server uses the current version of the dictionary to perform the encoding. For example, assume that column vector 104 is repopulated after dictionary 106d (version 2 of the dictionary) has been created. During the repopulation of column vector 104, the current values from rows 212 are used to create the uncompressed version of the column vector, and then dictionary 106d is used to encode/compress the column vector.

As soon as each of the column vectors that rely on a non-current version of a global dictionary has been discarded and/or repopulated, the non-current version of the global directory may be discarded. In the present example, dictionary 106c may be discarded as soon as each of column vectors CV1-CV8 has been discarded or repopulated. To know when each version of a dictionary may be discarded, a "usage-count" maintained for each version of the dictionary. The usage-count of a dictionary version is incremented each time the dictionary is used to encode a column vector, and decremented each time a column vector that was encoded using the dictionary version is either discarded or repopulated.

For example, after dictionary 106c has been used to encode column vectors CV1-CV8, the usage-count for dictionary 106c will be eight. When any of column vectors CV1-CV8 are rebuilt or discarded, the usage-count for dictionary 106c is decremented. Upon the repopulation or discarding of the last of column vectors CV1-CV8, the usage-count for dictionary 106c will be zero, and the database server will discard dictionary 106c.

Prefix Compression

According to one embodiment, the size of dictionaries used to encode column vectors is reduced through the use of prefix compression. Prefix compression avoids the redundant storage of the beginning of values, when consecutively stored values begin the same. Prefix compression is particularly useful for the coding dictionaries described herein because, within each sort order set, the values are sorted. Consequently, there is an increased likelihood that contiguously stored values within the dictionary will have common prefixes. Prefix compression is described, for example, at www.stoimen.com/blog/2012/02/06/computer-algorithms-data-compression-with-prefix-encoding/.

Cross-Node Dictionary Sharing

In the examples given above, multiple column vectors, stored within IMCUs in the volatile memory of a single node, share a common dictionary. However, in alternative embodiments, the IMCUs that share a common dictionary may be spread among multiple nodes in a database cluster. In such embodiments, the each of the nodes maintains a copy of the common dictionary, and keeps its copy of the dictionary in sync with the other nodes through inter-node communications. For example, in response to one node appending an entry to the shared dictionary for a previously unencountered value, the node would send a message to cause all other nodes to append the same entry to their local copies of the shared dictionary.

Such cross-node dictionary sharing may be useful, for example, when performing a cross-node join. For example, assume that a database command calls for a join between c1 and c2, and a column vector with values from c1 is in the volatile memory of a first node, and a column vector with values from c2 is in the volatile memory of a second node. If both column vectors were encoded using the same dictionary, then the join may be performed by comparing the codes from the column vectors, without having to first translate the codes to their corresponding values.

Benefits

As mentioned above, maintaining a local dictionary for each column vector may result in wasted space because, depending on the number of distinct values in the column, the data may be repeated across column vectors. Additionally, the encoded column vector data loses meaning beyond column vector boundaries because it is local dictionary encoded and thus, needs to be decoded to the actual value at each column vector boundary. Further, during the processing of a database query, it is desirable to keep the encoded value as long as possible for performance reasons. A global dictionary across all column vectors alleviates both the problems.

With respect to avoiding wasted space, the global dictionary is always as large as the number of distinct values in the column, so it is more space efficient than keeping a local dictionary on each column vector. With respect to deferring the materialization of column vectors, the column vector data is encoded using global dictionary codes allowing decoding to be delayed to beyond column vector boundaries, resulting in performance improvements in join and aggregate database queries. Thus, employing the techniques described herein may provide one or more of the following benefits:

a. Flexibility to create the global dictionary ("GD") upfront and encode while the data is being loaded into memory or lazily when the data is already laid out as column vectors b. Maintain GD when the column vector data changes due to table inserts, updates, or deletes.

c. Maintain a multi-versioned GD to enable (a) and (b) and provide high concurrency for readers and writers d. Maintain each version of the GD as mostly sorted for quicker logarithmic-time lookup, as opposed to linear time lookup e. Maintain local dictionary for each column vector using GD codes and encode using local codes for even greater space savings f. Allow co-existence of global and local dictionary encoded column vectors g. Maintain various versions of GD to ensure quick encoding and decoding h. Allow persistence of GD versions on-disk for reuse across database instance restarts i. Allow compression of GD itself for further space savings j. Keep auxiliary data structures on top of GD to further speed-up data processing on GD.

Further, with a multi-versioned GD, writers (processes that are encoding and therefore adding entries to the GD) do not to block readers (processes that are decoding) of previous versions of the GD. Also, writers are never blocked by readers.

Further, each higher version of a GD is a superset of the values from the older versions, allowing quick remapping between codes from one version to the other. Sort-orders within each version allow logarithmic-time lookup for symbols. Each sort-order is a sorted array of symbols allowing use of binary-search. Another property of sort-orders is that the writers append at the tail of the last sort-order allowing the readers on previous sort-orders to not get blocked. Also, writers never get blocked by readers Use of a GD allows faster data loads into memory because of one global dictionary used to encode all column vectors, as opposed to creating a local dictionary for each column vector.

Selective Use of Global Dictionaries

In general, columns that contain a low to medium number of distinct value are more suited to be encoded with a GD. Columns with a very high number of distinct values benefit less. Therefore, according to one embodiment, the database server performs an analysis of column data to determine utility of encoding with GD. Only if the utility is high does the database server proceed to encode with GD. Otherwise, the database server uses local dictionary encoding (e.g. one dictionary per column vector).

Overview of Global Dictionary Creation and Maintenance

Figure 5:
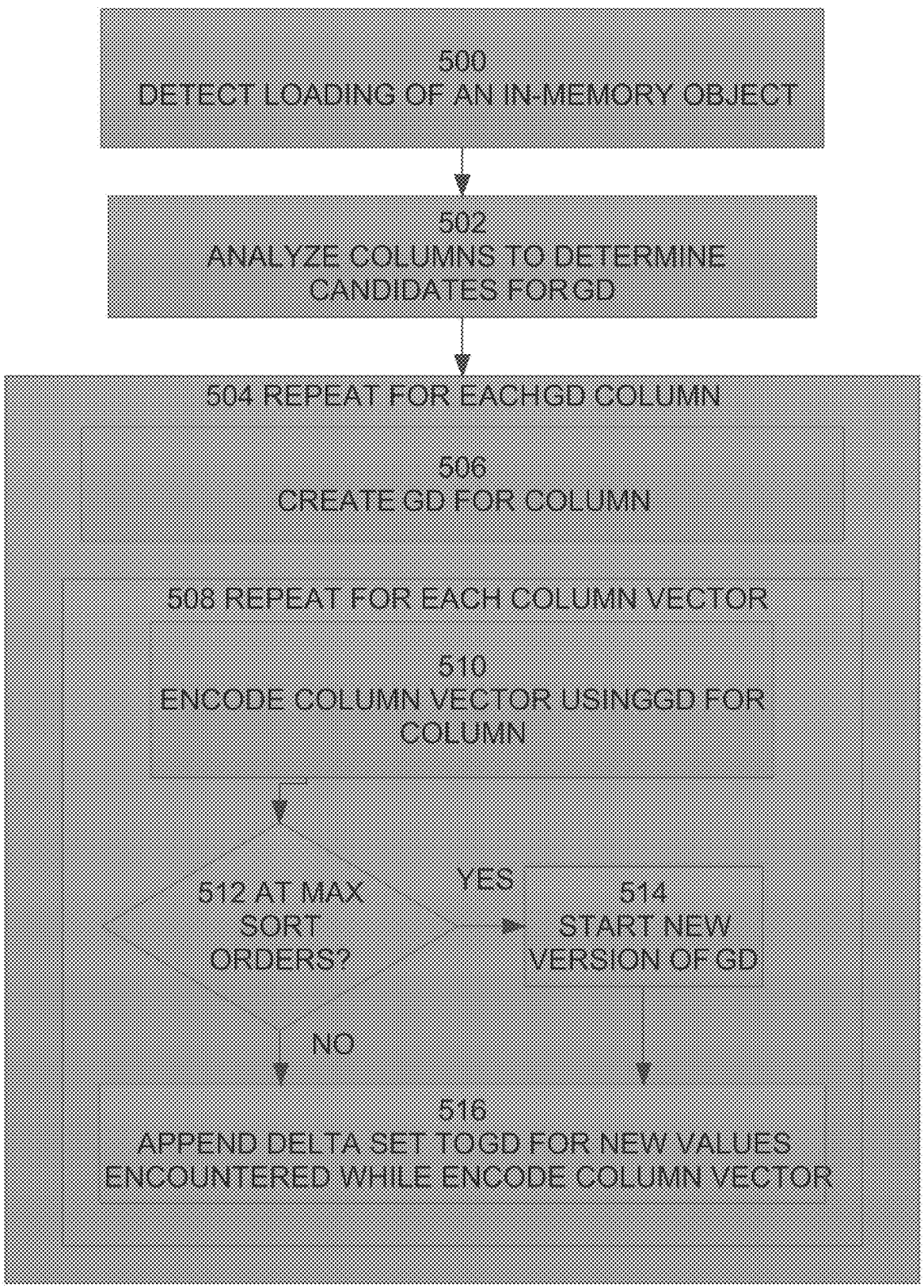
FIG. 5 is a flowchart illustrating steps of creating an in-memory copy of a column, where the in-memory copy is stored in multiple column vectors that are encoded using a versioned global dictionary, according to an embodiment.

Referring to FIG. 5, it is a flowchart depicting an overview of global dictionary creation and maintenance, according to an embodiment. Typically, a global dictionary (GD) is created when a table marked to be in-memory is brought into memory (step 500), and is being laid out in the form of column vectors. Specifically, at step 502, for each column in the table, an analysis phase is done to identify whether the column is a good candidate for encoding with GD or not. Among other statistics, one that the database server may look at is the number of distinct values (NDVs) in the column. If the ratio of NDVs with the total number of rows is below a threshold, then the database server selects the column as a column for which a global dictionary will be used (a "GD" column).

Box 504 encompasses steps performed by the database server for each column that is selected to be a GD column. At step 506, a global dictionary is created for the GD column. Initially, the GD for each GD column will be empty. Box 504 includes steps performed for each column vector of a GD column. Specifically, at step 510, a column vector of the GD column is encoded. For each column vector, the column values are looked up in the GD and the appropriate code is obtained. If the value is not found or if it is the first column vector and no GD is present, then the values are maintained as a delta-set and, at step 516, added to the GD.

As explained above, each delta-set addition introduces a new sort-order in the GD. The number of sort-orders is capped by a system parameter and upon reaching that many sort-orders (tested at step 512), a new GD version is created (step 514) whose first sort-order is a sorted superset of all the sort-orders of the previous version.

As the data is brought into memory, generally the number of new distinct values decrease and the database server is able to lookup the corresponding GD codes for the repeated values by a binary-search of each sort-order in a particular version. Additionally, each column vector maintains a local dictionary of symbols present in only that column vector and is encoded using the GD codes. The actual column vector values are encoded using local codes, implicitly obtained from the index of GD encoded local symbol dictionary, to keep the code footprint of the real data to a minimum.

Because the GD codes are fixed length, the techniques described herein also obviate the need to keep a symbol lengths array with the local dictionary. In the header of the encoded column vector, the database server keeps the GD version information to quickly know the version to decode the values. If the table data changes due to inserts/updates/deletes, the information is maintained as metadata with each column vector. Whenever the column vector is refreshed for new values, the current version of the GD is used to perform the encoding.

As explained above, if a GD version is no longer referenced by any column vector, then the database server reclaims that space. The space can be reclaimed, for example, by using a background job that periodically checks for such versions. The background job may also be used to achieve all of the following:

Lazy materialization of GD if the column-vectors are loaded in non-GD encoded format Creation and maintenance of auxiliary data structures to assist in data processing on GD Repacking the dictionary by removing unused symbols and codes

IMCU Pruning

According to one embodiment, an inverted index may be used in conjunction with a global dictionary to perform "IMCU pruning" during expression evaluations. Specifically, the inverted index may indicate, for each code in the global dictionary, the IMCUs that have column vectors in which a value was mapped to that code.

For example, assume that the value "ALASKA" maps to code "1". Assume that column c1 is broken into five column vectors CV1, CV2, CV3, CV4 and CV5, all of which are encoded using the same global dictionary. If CV1, CV4 and CV5 have instances of the value "ALASKA", and CV2 and CV3 do not, then the inverted index entry for the code "1" would indicate the IMCUs containing CV1, CV4 and CV5.

An inverted index containing an entry for each code, where each entry indicates which IMCUs that have column vectors that contain the code, can be used to perform IMCU pruning. Specifically, when an expression involves a particular code, those column vectors that do not have the code may sometimes be skipped during the expression's evaluation. For example, assume that the expression is "c1=ALASKA". This translates to "c1=1". Using the index, the entry for "1" identifies the IMCUs containing CV1, CV4 and CV5. Based on this information, the database server need not evaluate the expression against values in CV2 and CV3, because no value in encoded column vectors CV2 and CV3 could possibly satisfy the expression "c1=1".

Evaluating Expressions Using Encoded Column Vectors

As explained above, column vectors are created for a column, and maintained in volatile memory, to speed up the processing of database commands that access values in the column. As also explained above, dictionary encoding is often used to compress those column vectors to reduce storage space and improve performance. Often, expressions on columns can be evaluated directly on the dictionary-compressed vectors, thereby avoiding the overhead of decoding the column vectors to reproduce the original values. Evaluating SQL expressions is an extremely important database operation. The query execution engine is the heart of a DBMS for analytical workloads. Query execution performance is even more relevant for in-memory databases, where the only bottleneck remaining is CPU bandwidth.

When evaluating expressions using a dictionary-encoded column vector, it is conventional to process expressions one row at a time. This can lead to unnecessary (and redundant) computation. For example, assume that the query scan expression is "where (A*(1−B))=10". The expression "(A*(1−B))=10" shall be referred to herein as EXPA. The expression (1−B), which is a subexpression of EXPA, shall be referred to herein as EXPB.

For the purpose of explanation, assume that there are 1 million rows in the table to which columns A and B belong. Assume further that dictionary DictA was used to encode the column vector for column A, and dictionary DictB was used to encode the column vector for column B. Under these circumstances, conventional expression evaluation would involve performing the following for each of the million rows:

read, for current row, the code from column vector of column B (BCode)

use DictB to find the value to which BCode maps (BValue)
calculate 1−BValue to get result of EXPB (FirstResult)
read, for current row, the code from column vector of column A (ACode)
use DictA to find the value to which ACode maps (AValue)
calculate AValue*FirstResult to get SecondResult
compare SecondResult to 10

However, if B has only 16 distinct values, and A has only 4 distinct values, then the theoretical max number of comparisons needed is only 64. The overall number of computations can be even less, if not all of the possible distinct combinations are in the actual data. Furthermore, if there was a predicate that filtered some percentage of the rows prior to evaluating EXPA, then the max number of operations to be performed is based on the distinct number of (A,B) pairs found in the passing rows. The distinct number of (A,B) pairs in the passing rows would be the absolute fewest number of operations to be performed on dictionary-encoded vectors.

Overview of Caching Expression Results

To reduce the number of redundant evaluations that occur when an expression is evaluated against an encoded column vector, techniques are provided for caching results of expression evaluations. According to one embodiment, when a database server is executing a query that includes an expression that references columns for which dictionary-encoded column vectors exist, the database server performs a cost-based analysis to determine which expressions (or sub-expressions) would benefit from caching the expression's evaluation result. Those expressions (or sub-expressions) that the database server determines will benefit from caching are referred to herein as "cached-result expressions" or (CREs).

For each of the CREs, the database server performs the necessary computations and caches the results for each of the possible distinct input values. When evaluating a CRE for a row with a particular set of input codes, a look-up is performed based on the input code combination to retrieve the pre-computed results of that evaluation from the cache. These techniques not only avoid redundant computation for single-threaded applications, but also across parallel execution where multiple processes are evaluating the same expression (same query). In parallel execution environments, execution is still optimal across the slaves in that an expression for a distinct set of input codes is computed only once, and then shared across all parallel slaves.

For example, when evaluating the expression EXPA "(A*(1−B))=10", assume that B has 4 unique values, and A has 2000 unique values. Under these circumstances, the database server may decide to cache results for EXPB (1−B) which has a maximum of 4 distinct inputs, and not to cache results for EXPA which has a maximum of 8000 distinct inputs.

To cache the results for EXPB the database server calculates the results for each of the four distinct inputs of EXPB, and then stores the results in a structure that allows fast look-ups based on the dictionary codes. Structures used to store the cached results of expressions are referred to herein as "structures for cached-result lookups" or "SCRLs".

For the purpose of explanation, assume that the four distinct values of B are 4, 12, 17 and 37, and that DictB maps those values to codes 0, 1, 2, and 3, respectively. Under these circumstances, the database server determines the results of (EXPB) for code 0 by:
  using DictB to determine that 0 maps to 4
  calculating (EXPB) as 1−4=−3
  Similarly, the database server determines the results of (EXPB) for code 1 by:
  using DictB to determine that 1 maps to 12
  calculating (EXPB) as 1−12=−11
  Likewise, the database server determines the results of (EXPB) for code 2 by:
  using DictB to determine that 2 maps to 17
  calculating (EXPB) as 1−17=−16
  Finally, the database server determines the results of (EXPB) for code 3 by:
  using DictB to determine that 3 maps to 37
  calculating (EXPB) as 1−37=−36

After deriving the expression results for each of the four codes for B, the results are cached in a SCRL. In the present example, the SCRL used to cache the results of (EXPB) may be a simple one-dimensional array of four values arranged such that the code can be used as an index into the array to find the array element that stores the result for that code. In the present example, the array entries would be −3, −11, −16 and −36, in that order. Because the results of (EXPB) are cached in this manner, the operations to evaluate EXPA for each row may be modified as follows:
  read, for current row, the code from column vector of column B (BCode)
  use BCode as index into array to get result of EXPB (FirstResult)
  read, for current row, the code from column vector of column A (ACode)
  use DictA to find the value to which ACode maps (AValue)
  calculate AValue*FirstResult to get SecondResult
  compare SecondResult to 10

Thus, because (EXPB) is a CRE, the two steps:
  use DictB to find the value to which BCode maps (BValue)
  calculate 1−BValue to get result of "EXPB" (FirstResult)
are replaced with the single step:
  use BCode as index into array to get result of "EXPB" (FirstResult)

In this example, the replaced step is a subtraction operation which, performed on integers, is relatively inexpensive. However, depending on the nature of the expression, the calculation that is avoided through the use of result-caching may involve a significant amount of work, such as finding the square root of a real number. Further, these techniques are equally applicable to expressions that contain non-numeric variables, such as strings. The computational overhead reduction achieved by avoiding the need to perform an expensive string operation, such as SUBSTR, on every value in the string column of a table with millions of rows is significant.

Cached Result Expressions with Multiple Columns

In the example given above, EXPB references a single column (column B). However, expressions that reference multiple columns may also be selected as CREs, as long as the expressions satisfy the CRE selection criteria. For example, assume that the selection criterion is that there are no more than 50 distinct input combinations to the expression. Assume further that the cardinality of column A is 10, and the cardinality of column B is 4. Under these circumstances, EXPA ((A*(1−B))=10) qualifies to be selected as a CRE.

The selection criteria may take into account one or more of:
  the maximum possible input combinations to an expression,
  the actual number of input combinations to the expression, or
  the actual number of input combinations to the expression after applying a query's filter.

For example, if column A has a cardinality of 10 and cardinality of column B is 4, then EXPA ((A*(1−B))=10) would not satisfy selection criteria of "max input combinations <30" because the maximum possible number of input combinations to this expression, given the cardinalities, is 40. However, under these same circumstances, EXPA ((A*(1−B))=10) may satisfy selection criteria of "actual input combinations <30" if it turns out that the rows in question only have 24 of the possible 40 combinations. Further, even when the rows in question have 24 input combinations to the expression, the query may have a filter which, after being applied to the rows, only leaves rows that reflect 5 of the 40 possible input combinations.

In response to selecting EXPA to be a CRE, the database server calculates the result of EXPA for each possible combination of (A, B) input codes, and stores the results in a SCRL that is indexed based on the code combinations. For example, the SCRL used to cache the results of EXPA may be a two-dimensional array, where the result of the expression for any given combination of input codes (ACode, BCode) is located within the array at a position indexed by [ACode][BCode]. For example, assume that the value "10" in column A maps to code "3" in DictA, and that the value "12" in column "B" maps to code "5" in DictB. Under these circumstances, the entry, within the two-dimensional array, that corresponds to the index values [3][5] would contain a value indicating "False", because ((10*(1−12))=10) is False.

Once the SCRL for the expression EXPA has been built, the operations to evaluate EXPA for each row may be modified as follows:
  read, for current row, the code from column vector of column B (BCode)
  read, for current row, the code from column vector of column A (ACode)
  use ACode and Bcode to index into SCRL of EXPA to get result for current row Evaluating Expressions Using the SCRL of Subexpressions In the multi-column CRE example given above, the database server evaluates EXPA for each possible distinct input code combination. During these evaluations, the database server may take advantage of the SCRLs of any subexpressions of EXPA. For example, assume that the database server is evaluating EXPA for the combination (ACode,BCode). The database server would be able to determine the result by:
  reading, for current row, the code from column vector of column B (BCode)
  using BCode as index into SCRL of EXPB to get result of EXPB (FirstResult)
  reading, for current row, the code from column vector of column A (ACode)
  using DictA to find the value to which ACode maps (AValue)

calculating AValue*FirstResult to get SecondResult
comparing SecondResult to 10

The result of that comparison would then be stored in the entry of the two dimensional array (the SCRL of EXPA) that corresponds to [ACode][BCode].

Benefits of Caching Expression Results

As explained above, the operations required to evaluate a CRE are only performed once for each set of distinct inputs. In some embodiments, the techniques take into account not only the uniqueness of values within a dictionary, but also the uniqueness across common sub-expressions within a query, across multiple queries, across parallel slaves, or across a cluster of nodes. By performing expensive complex operations "once" per distinct set of inputs, CPU overhead is greatly reduced.

Specifically, instead of evaluating complex expressions per row, the techniques described herein evaluate expressions at the order of distinct input sets, which can be many magnitudes faster than what is done today. Furthermore, the result-caching techniques described herein may be used in environments where, as described above, column in-memory data stores are encoded with global dictionaries (dictionaries used by vectors across processes, and/or across nodes). Evaluating expressions on a global dictionary (and caching their results) reduces redundant execution across an entire system, leading to increase query throughput.

Further, many DBMSs are running on systems with many cores. With a significant number of cores means more threads for parallel execution. This means more threads will be accessing a global dictionary to evaluate expressions. Rather than each thread duplicating work being done on a separate thread, evaluating a query expression for a given distinct set of inputs once (on some given thread) and then shared across other threads, is more efficient.

More Complex Example

For the purpose of explanation, an example shall be given in which the database is processing the following query (Q1):

select sum($A*(1-D)$), sum($A*(1-D)*(1+B)$) from T where C=10

It shall be assumed that each IMCU for table T has column vectors for columns A, B, C and D, and that each column vector has codes for the values in 1 million rows. The column vectors in each IMCU may be encoded using local dictionaries, or the same global dictionaries may be shared across multiple IMCUs.

When a database server processes Q1, the expressions in the select clause must be evaluated for the rows that satisfy the predicate "C=10". Those expressions include:

$(A*(1-D))$ and  EXP1

$(A*(1-D)*(1+C))$  EXP2

EXP1 includes the subexpression (1−D) which shall be referred to as EXP3.
EXP2 includes both the subexpression EXP3 and the subexpression (1+C) which shall be referred to herein as EXP4.

Due to the condition "where C=10", not all rows will be evaluated for the select expressions. In one embodiment, if a sub-expression contains a single column whose cardinality (i.e. number of distinct values) is lower than some threshold, then that sub-expression is selected to be a cached-result expression. All such cached-result expressions are evaluated separately on just the distinct values for the columns that are referenced by the expression.

For example, EXP3 (i.e. 1−D) is a subexpression of both the two expressions (EXP1 and EXP2) in the SUM aggregates. If the cardinality of D is less than some threshold, then EXP3 is selected to be a CRE, and is evaluated for just the distinct values of D.

Computation of (1−D) can either be done on-the-fly (i.e. during evaluation of the SUM aggregate), or done prior to performing the aggregation. In either case, the results are computed and stored in a lookup table. This table, which serves as the SCRL for EXP3, may be be accessed concurrently by other processes looking to fill in the values of EXP3, and so the table rows for distinct values of D must be locked prior to being updated.

A higher-level expression may consume sub-expressions that are CREs, and may themselves be selected as CREs when the higher-level expressions reference some set of columns for which the max cardinality is lower than some threshold. For example, "(1−D)*(1+C)" may have |D| and |C| small enough such that the database server selects "(1−D)*(1+C)" as a CRE. Computation of such higher-level expressions can make use of the results computed for (1−D) that are already being cached, or the database server can compute the expression for |D|×|C| inputs all-together.

Shared Sub-Expressions

If a sub-expression is shared across multiple expressions, then the test used by the database server to determine whether the subexpression should be a CRE may modified. For example, the threshold below which the unique input combinations must fall for an expression to qualify as a CRE may be significantly increased. Thus, subexpressions that are shared across multiple expressions may still qualify as CREs even when they have a very high number of distinct input combinations, since re-computation of the subexpression in multiple higher-level expressions could be expensive. Such is the case for (A*(1−D)). Although |A| may be significantly large, computing (A*(1−D)) per distinct value of A and caching those results may make sense given that (A*(1−D)) is a common sub-expression between EXP1 and EXP2.

Two-Phase Evaluation

According to one embodiment, a database server evaluates expressions using the techniques described herein in two distinct phases: a compilation phase and an evaluation phase. Given the expression to be evaluated, during the compilation phase, the database server identifies which subexpressions (or possibly the entire expression) satisfy the test for caching the results. Candidacy for caching is based on factors such data-type, dictionary cardinalities and position in the expression tree. According to one embodiment, the output of the compilation phase is an expression tree whose inner nodes are the identified subexpressions.

During the evaluation phase, that database server computes the results of the expression for combinations of dictionary entries as the inputs for the expression's column operands, and puts the results in an SCRL. As shall be described in detail hereafter, the results of the identified subexpressions may be cached by either (a) pre-computing for all the expression for all input combinations, or (b) populating the cache on-the-fly, as new input combinations are encountered while the expression is evaluated against the content of column vectors. As mentioned above, some expressions that are selected to be CREs may have subexpressions that are also selected as CREs. In this case, the SCRLs of the subexpressions may be used to evaluate the expression, or the expression may be evaluated directly.

The Compilation Phase

Figure 6:
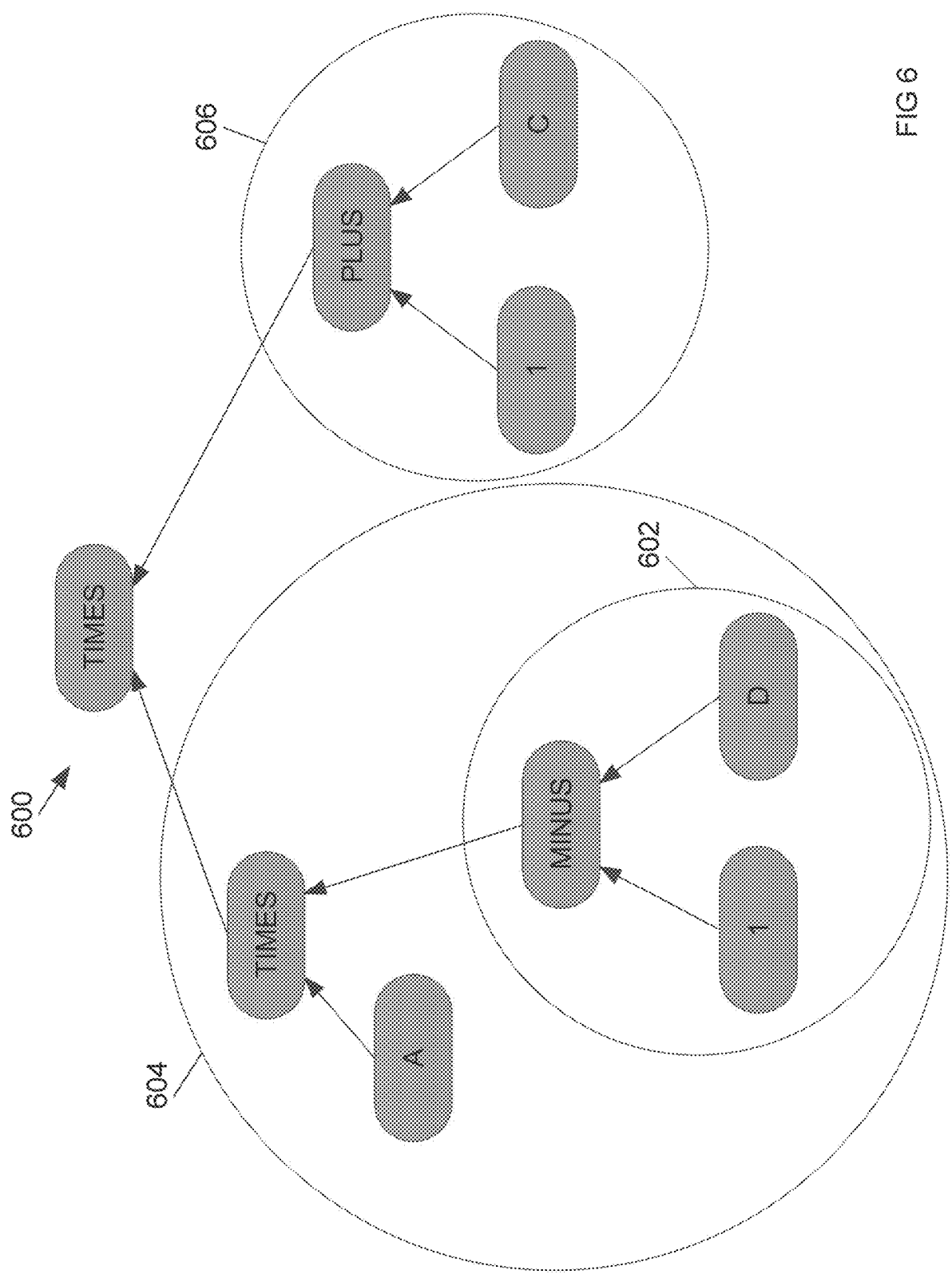
FIG. 6 is a block diagram of a tree that represents the expression $(A*(1-D)*(1+C))$.

As mentioned above, the compilation phase involves identifying the expressions that need to be evaluated to execute a query, and selecting which of those expressions, if any, that pass the test to be selected as CREs. According to one embodiment, to identify the expressions, a tree structure is generated in volatile memory to represent the expression. A tree for the expression (A*(1−D)*(1+C)) is illustrated, for example, in FIG. 6. Referring to FIG. 6, tree 600 represents the entire expression (A*(1−D)*(1+C)). Portion 602 of the tree 600 represents the subexpression (1−D). Portion 604 of tree 600 represents the subexpression (A*(1−D)). Portion 606 of tree 600 represents the subexpression (1+C).

According to one embodiment, when determining which expressions to select as CREs, the entire expression, and each subexpression thereof, are tested. In the example illustrated in FIG. 6, the following table illustrates how a database server may decide which expressions to cache based on the cardinalities of the columns involved:

| \|A\| | \|C\| | \|D\| | CREs |
|---|---|---|---|
| High | High | High | None |
| High | High | Low | (1 − D) |
| High | Low | High | (1 + C) |
| High | Low | Low | (1 + C), (1 − D) |
| Low | High | High | None |
| Low | High | Low | (1 − D), (A * (1 − D)) |
| Low | Low | High | (1 + C), (A * (1 + C)) |
| Low | Low | Low | (1 + C), (1 − D), (A * (1 − D)), (A * (1 − D) * (1 + C)) |

The test of which expressions to select may take into account factors other than or in addition to the cardinality of the input combinations to the expressions. For example, according to one embodiment, an expression expr1 is selected as a CRE if:
condition 1: its result data type is arithmetic
condition 2: the cardinality of its input combinations is sufficiently small (<threshold1)
condition 3: there is no expression expr2 such that:
  a. expr2 contains expr1
  b. the cardinality for expr2 is sufficiently small (<threshold2)
  c. The set of top level expressions that contain expr1 is the same as expr2, and
  d. The result type of expr2 is arithmetic.

Condition 3 ensures that the expression that the database server selects as a CRE is in a sense maximal (the conditions a-d describe an expression expr2 that, if cached, would make caching expr1 have less benefit). According to one embodiment, after determining which expression(s) qualify to be CREs, the database server produces a set of trees whose nodes represent subexpressions whose results will be cached.

In one embodiment, for each expression to be evaluated, the database server generates a tree of subexpressions to cache. Each such tree may have three kinds of nodes: leaf nodes, inner nodes, and the root node. Leaf nodes correspond to columns. Inner nodes correspond the cached subexpressions. The root corresponds to the expression as a whole.

The Evaluation Phase

After the CREs have been selected for a received query, the evaluation phase is performed. The evaluation phase is the phase in which:
SCRLs are created and populated for each expression of the query that is selected as a CRE, and
the SCRLs are used to evaluate the expressions contained in a query for each of the rows selected by the query.

According to one embodiment, the SCRLs of the CREs may be pre-prepopulated, or populated on-the-fly. A database server may decide to use pre-population for all CREs for a given query, to use on-the-fly population for all CREs selected for a given query, or to use pre-population for some CREs and on-the-fly population for other CREs of the same given.

Figure 7:
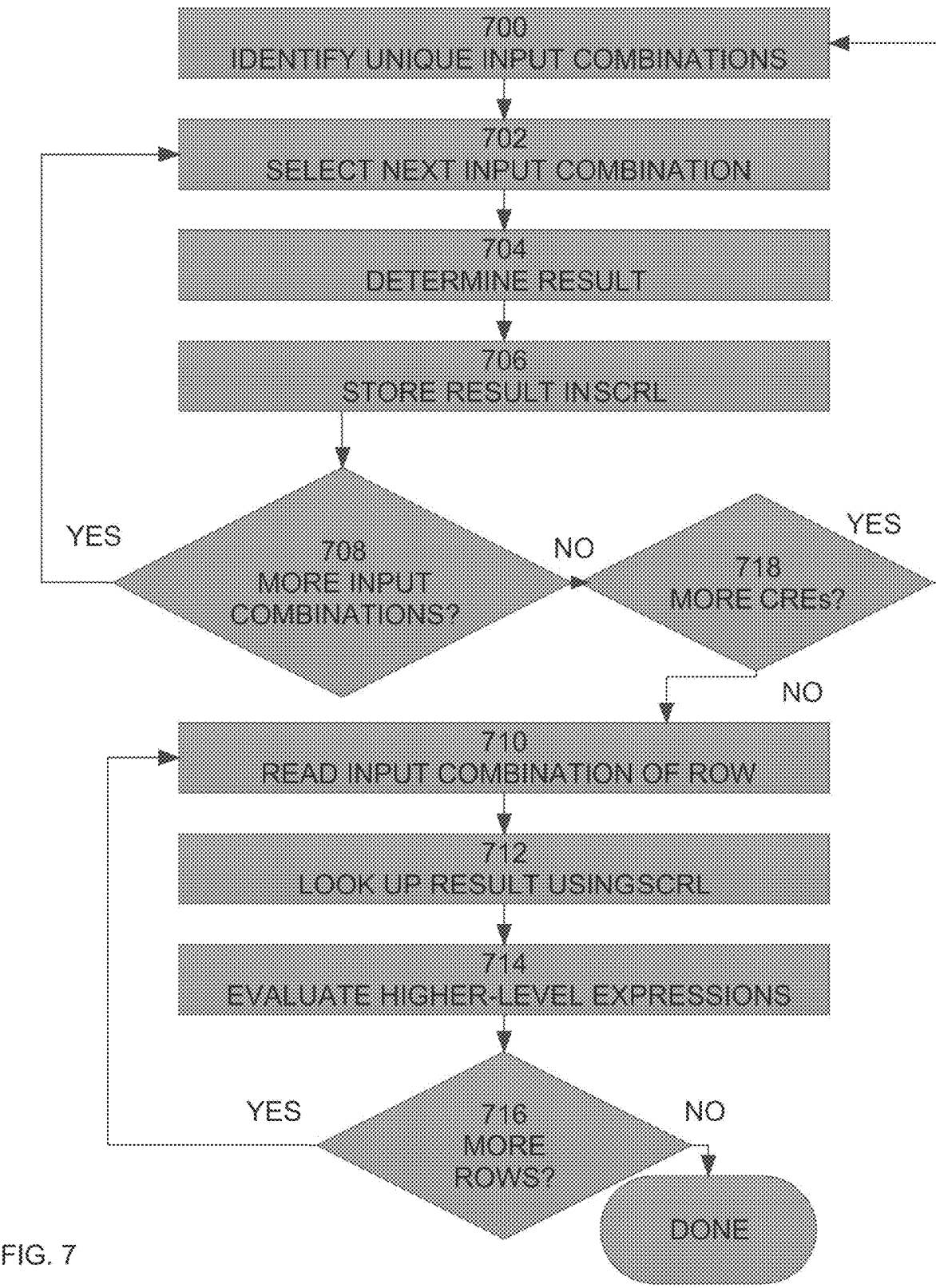
FIG. 7 is a flowchart showing steps for pre-populating a structure for cached-result lookup, according to an embodiment.
Figure 8:
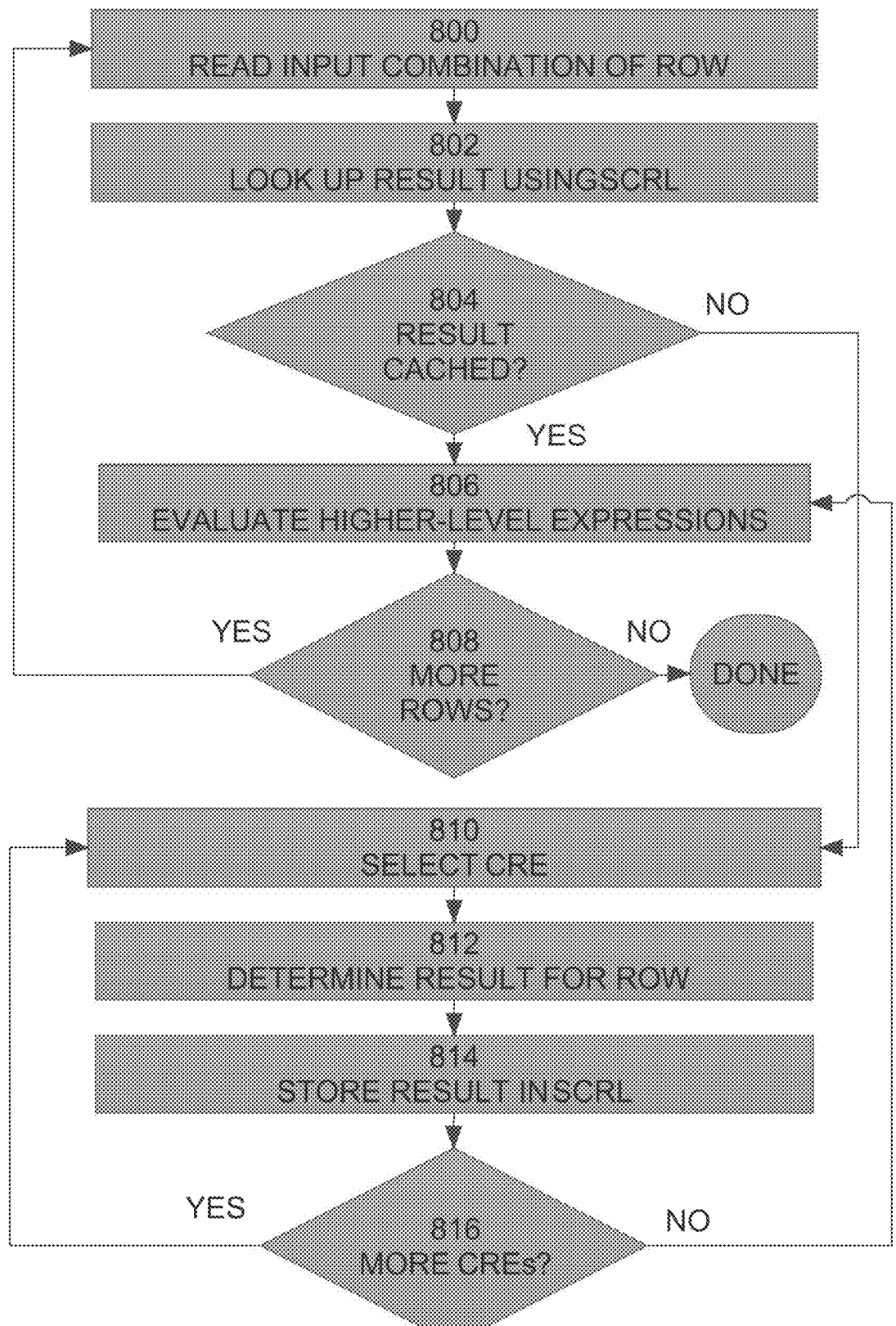
FIG. 8 is a flowchart showing steps for on-the-fly population of a structure for cached-result lookup, according to an embodiment.

FIG. 7, it is a flowchart that illustrates pre-population of an SCRL, according to an embodiment. FIG. 8 is a flowchart that illustrates on-the-fly population of an SCRL, according to an embodiment. Pre-population of SCRLs and on-the-fly population of SCRLs shall be described in greater details hereafter.

Pre-Population of SCRLs

For the purpose of explanation, assume that the database server receives Q1: select sum(A*(1−D)), sum(A*(1−D)*(1+B)) from T where C=10.

Assume further that, during the compilation phase, expressions:

$$(A*(1-D)), \text{ and} \qquad \text{EXP1}$$

$$(1-D) \qquad \text{EXP3}$$

are selected as CREs. Assume that table T has the following five rows:

|    | A | B | C  | D |
|----|---|---|----|---|
| R1 | 5 | 7 | 10 | 4 |
| R2 | 8 | 3 | 6  | 5 |
| R3 | 8 | 4 | 6  | 5 |
| R4 | 5 | 8 | 10 | 4 |
| R5 | 3 | 2 | 10 | 3 |

It shall also be assumed that the code dictionaries for columns A, B, C and D are as follows:

| DictA | |
|---|---|
| CODE | VALUE |
| 0 | 5 |
| 1 | 8 |
| 2 | 3 |

| DictB | |
|---|---|
| CODE | VALUE |
| 0 | 7 |
| 1 | 3 |
| 2 | 4 |
| 3 | 8 |
| 4 | 2 |

| DictC | |
|---|---|
| CODE | VALUE |
| 0 | 10 |
| 1 | 6 |

| DictD | |
|---|---|
| CODE | VALUE |
| 0 | 4 |
| 1 | 5 |
| 2 | 3 |

Based on table T and these dictionaries, the column vector for column A (CVA) would have the codes 0, 1, 1, 0, 2, that map to values 5, 8, 8, 5, 3. The column vector for column B (CVB) would have the codes 0, 1, 2, 3, 4, that map to 7, 3, 4, 8, 2. The column vector for C would have the codes 0, 1, 1, 0, 0 that map to 10, 6, 6, 10, 10. The column vector for D would have the codes 0, 1, 1, 0, 2 that map to the values 4, 5, 5, 4, 3.

Preferably, the SCRLs of subexpressions are populated before the SCRLs of higher-level expressions so that the SCRLs of the subexpressions may be used to speed up the population of the higher-level expressions. Based on that policy, in the present example, the SCRL for EXP3 (1−D) is populated before the SCRL for expression EXP1.

Referring to FIG. 7, pre-populating the SCRL of EXP3 (1−D) begins at step 700, where all the unique input combinations to EXP3 (1−D) are determined. In present example, the unique input combinations to (1−D) are the codes for D (i.e. 0, 1 and 2). Steps 702-708 are then repeated for each of the unique input combinations. Specifically, at step 702, code "0" is selected. At step 704, the database server determines the result of EXP3 (1−D) when the input code is 0. In the present example, code 0 maps to "4", so the result of (1−D) is "−3". At step 706, "−3" is stored in the SCRL of EXP3 (1−D) in an entry that can be looked up based on input code "0". In the present example, "−3" may be stored in entry [0] of the one-dimensional array. Because there are more input code combinations to EXP3 (1−D), control passes from step 708 back to step 702.

During the second iteration of step 702, code "1" is selected. At step 704, the database server determines the result of EXP3 (1−D) when the input code is 1. In the present example, code 1 maps to "5", so the result of (1−D) is "−4". At step 706, "−4" is stored in the SCRL of EXP3 (1−D) in an entry that can be looked up based on input code "1". In the present example, "−4" may be stored in entry [1] of a one-dimensional array. Because there are more input code combinations to EXP3 (1−D), control passes from step 708 back to step 702.

During the third iteration of step 702, code "2" is selected. At step 704, the database server determines the result of EXP3 (1−D) when the input code is 2. In the present example, code 2 maps to "3", so the result of (1−D) is "−2". At step 706, "−2" is stored in the SCRL of EXP3 (1−D) in an entry that can be looked up based on input code "2". In the present example, "−2" may be stored in entry [2] of the one-dimensional array. Because there are no more input code combinations to EXP3 (1−D), control passes from step 708 to step 718. At this point, the SCRL for EXP3 (1−D) would be the fully populated one-dimensional array:

| SCRL of EXP3 (1 − D) | |
|---|---|
| index value (implicit) | CACHED RESULT |
| 0 | −3 |
| 1 | −4 |
| 2 | −2 |

At step 718, the database server determines whether there are any more CREs whose SCRLs have not yet been prepopulated. In the present example, the SCRL for EXP1 (A*(1−D)) has not yet been prepopulated. Therefore, at step 718 EXP1 (A*(1−D)) is selected and control passes back to step 700. At step 700, the unique input combinations to EXP1 (A*(1−D)) are determined. The unique input combinations are represented by the following (ACode, DCode) tuples: (0, 0), (0, 1), (0, 2), (1, 0), (1, 1), (1, 2), (2, 0), (2, 1), (2, 2).

Steps 702-708 are then repeated for each of these input code combinations. For example, in the first iteration, (0, 0) is selected at step 702. At step 704, the result of (A*(1−D)) is calculated for the input codes (0, 0). To evaluate (A*(1−D)) for (0, 0), the database server may use the SCRL of EXP3 (1−D) to determine that the result of EXP3 (1−D) for code 0 is −3. Then the database server uses DictA to determine that the value of A for code 0 is "5". Consequently, the result of EXP1 (A*(1−D)) for input combination (0,0) is 5*−3=−15. At step 706, −15 is stored in the [0][0] entry of a two-dimensional array used as the SCRL of EXP1 (A*(1−D)).

After repeating steps 702-706 for each of the nine input combinations of EXP1 (A*(1−D)), the two-dimensional array used to cache the results of EXP1 (A*(1−D)) would be populated as follows:

| SCRL of EXP1 (A * (1 − D)) | |
|---|---|
| Index values (implicit) | CACHED RESULT |
| 0, 0 | −15 (i.e. 5 * −3) |
| 0, 1 | −20 (i.e. 5 * −4) |
| 0, 2 | −10 (i.e. 5 * −2) |
| 1, 0 | −24 (i.e. 8 * −3) |
| 1, 1 | −32 (i.e. 8 * −4) |
| 1, 2 | −16 (i.e. 8 * −2) |
| 2, 0 | −9 (i.e. 3 * −3) |
| 2, 1 | −12 (i.e. 3 * −4) |
| 2, 2, | −6 (i.e. 3 * −2) |

Because EXP1 (A*(1−D)) and EXP3 (1−D) were the only expressions selected as CREs for the processing of query Q1, control passes from step 718 to step 710. Step 710 begins a loop in which each row is evaluated making use of the populated SCRLs. Specifically, in the first iteration, the input combination for the first row of table T is read from the respective column vectors. For the first row of table T, the column vectors for columns A, B, C and D contain the codes 0, 0, 0, 0, respectively. Codes 0, 0, 0, 0 represent the values 5, 7, 10 and 4 from R1 of table T.

At step 712, the input combination is used to look up cached results in the available SCRLs. In the present example, the input to (A*(1−D)) is the combination of the codes for columns A and D. Hence, (0,0) is used to index into the SCRL for EXP1 (A*(1−D)) to find the result of (A*(1−D)) for the first row of table T. In the present example, the lookup operation produces the result −15. At step 714, the higher-level expression is evaluated using this result. In the present example, Q1 is:

select sum(A*(1−D)),sum(A*(1−D)*(1+B)) from T
      where C=10.

Using the results from the SCRL of EXP1 (A*(1−D)), the expression becomes:

select sum(−15,sum(−15*(1+B)) from T where
      C=10.

The remainder of the expression evaluation proceeds as normal, where C=10 is evaluated by using code 0 as an index into DictC to retrieve the value 10, and then determining that 10=10 is true. Similarly sum(−15*(1+B)) is determined using code 0 to index into DictB to retrieve the value 7, and then multiplying −15 by (1+7) to produce −120.

Processing of each row of table T proceeds in this manner until at step 716 all rows have been processed. After all the rows have been processed any aggregation operations are performed, the final results of the query are generated, and the processing is done.

It should be noted that the actual sequence used in the row-by-row evaluation may vary from query to query. For example, for queries with WHERE conditions, the WHERE conditions may be evaluated for a row before all other expressions are evaluated for the row. By evaluating the WHERE condition against a row first, the database server need not evaluate the other expressions for the row at all if the row does not satisfy the WHERE conditions. Thus, in the present example, the need to evaluate sum(A*(1−D)), sum (A*(1−D)*(1+B)) for rows R2 and R3 of table T would be avoided because rows R2 and R3 do not satisfy the WHERE condition "where C=10".

It should also be noted that, because steps 702-708 are repeated for every possible combination of input values, the steps may be performed for input combinations that never actually occur in the rows that are selected by the query. In the example given above, (A*(1−D)) was calculated for the input codes (0, 1) even though no selected row of table T has the corresponding value combination (A=5, D=5). The number of input combinations that are not present in the actual input rows may be significant, particularly when the query has a highly selective predicate that filters out a large percentage of the rows. To avoid performing expression evaluations for input combinations that are not present in the selected rows, the SCRLs may be populated on-the-fly rather than prior to the row-by-row processing.

On-the-Fly Population of SCRLs

FIG. 8 is a flowchart illustrating steps for performing on-the-fly population of SCRLs, according to one embodiment. On-the-fly population of SCRLs refers to populating the SCRLs as query is being evaluated against the actual rows, as opposed to prior to the row-by-row evaluation (e.g. steps 710-718 in FIG. 7).

Referring to FIG. 8, at step 800 the database server reads the input combination for a row. For example, in step 100, for the first row of table T, the column vectors for columns A, B, C and D contain the codes 0, 0, 0, 0, respectively. Codes 0, 0, 0, 0 represent the values 5, 7, 10 and 4 from R1 of table T. At step 802, the database server uses the codes to index into the SCRL of EXP1 (A*(1−D)) and EXP3 (1−D). If the SCRL entry is empty, then the result for the expression has not yet been computed for the given input codes. Therefore, control passes from step 804 to step 810. When the first row of table T is processed, the SCRLs of both EXP1 (A*(1−D)) and EXP3 will be empty, as illustrated below:

| SCRL of EXP3 (1 − D) | |
| --- | --- |
| index value (implicit) | CACHED RESULT |
| 0 | Empty |
| 1 | Empty |
| 2 | Empty |

| SCRL of EXP1 (A * (1 − D)) | |
| --- | --- |
| Index values (implicit) | CACHED RESULT |
| 0, 0 | Empty |
| 0, 1 | Empty |
| 0, 2 | Empty |
| 1, 0 | Empty |
| 1, 1 | Empty |
| 1, 2 | Empty |
| 2, 0 | Empty |
| 2, 1 | Empty |
| 2, 2 | Empty |

Steps 810 to 816 are repeated for each CRE for which the results have not yet been computed for the input combination of the row that is being evaluated. In the present example, EXP3 (1−D) would be evaluated for the input (DCode=0), and EXP1 (A*(1−D)) would be evaluated for the input combination (ACode=0, DCode=0). The result of evaluating (1−D) for code 0 is −3. So during the first iteration of step 814, the result −3 is stored in entry [0] of the array that serves as the SCRL of EXP3 (1−D). The result of evaluating (A*(1−D)) for input (ACode=0, DCode=0) is −15. Thus, during the second iteration of step 814, −15 is stored in entry [0][0] of the two-dimensional array that serves as the SCRL of EXP3 (1−D). After these steps are performed, the SCRLs will be populated as follows:

| SCRL of EXP3 (1 − D) | |
| --- | --- |
| index value (implicit) | CACHED RESULT |
| 0 | −3 |
| 1 | Empty |
| 2 | Empty |

| SCRL of EXP1 (A * (1 − D)) | |
| --- | --- |
| Index values (implicit) | CACHED RESULT |
| 0, 0 | −15 |
| 0, 1 | Empty |
| 0, 2 | Empty |
| 1, 0 | Empty |
| 1, 1 | Empty |

| SCRL of EXP1 (A * (1 − D)) | |
|---|---|
| Index values (implicit) | CACHED RESULT |
| 1, 2 | Empty |
| 2, 0 | Empty |
| 2, 1 | Empty |
| 2, 2, | Empty |

After the SCRLs have been populated for the code combinations in the first row, control returns from step 816 to step 808 and the remainder of the query is evaluated. The loop formed by steps 800 to 808 is repeated for each row against which the query was issued, where cached results are used for rows whose input combinations were previously encountered, and results are generated and cached for rows whose input combinations were not previously encountered.

After processing the five rows of table T, the SCRLs of EXP3 (1−D) and EXP1 (A*(1−D)) would be populated as follows:

| SCRL of EXP3 (1 − D) | |
|---|---|
| index value (implicit) | CACHED RESULT |
| 0 | −3 |
| 1 | −4 |
| 2 | empty |

| SCRL of EXP1 (A * (1 − D)) | |
|---|---|
| Index values (implicit) | CACHED RESULT |
| 0, 0 | −15 |
| 0, 1 | Empty |
| 0, 2 | Empty |
| 1, 0 | Empty |
| 1, 1 | Empty |
| 1, 2 | Empty |
| 2, 0 | Empty |
| 2, 1 | Empty |
| 2, 2, | −6 |

As is evident by empty entries in the SCRLs above, on-the-fly evaluation may result in significantly fewer evaluations than prepopulating the SCRLs due to the fact that, after filtering based on the query's predicate, the set of rows that are selected by the query may reflect only a small subset of the possible input code combinations.

Expressions Involving Columns that are not Encoded

In the examples given above, it was assumed that dictionary encoded column vectors existed for each of the columns referenced by query Q1. However, the techniques described herein do not require all referenced columns to have dictionary encoded column vectors. For example, the techniques may be used in situations where some column vectors are not dictionary encoded, and even in situations where some referenced columns do not have a cached column vector at all. For example, the techniques described above could be applied equally to Q1 in a scenario in which:
one or more of columns A, B, C and D were mirrored by column vectors that were not dictionary encoded, and/or
one or more of columns A, B, C and D were not mirrored at all (i.e. had no cached column vector)

When a column is mirrored in a dictionary encoded column vector, determining the cardinality of the column is relatively simple, because it is equal to the number of entries in the dictionary used to encode the column vector. Consequently, determining the number of unique inputs of an expression that references multiple columns that have dictionary encoded column vectors is relatively simple.

In scenarios in which some of the columns referenced in a query are not mirrored in dictionary encoded column vectors, the database server may (a) automatically disqualify expressions that reference such columns from being selected as CREs, or (b) determine the cardinality of such columns by other means. The cardinality of such columns may be determined, for example, from cardinality statistics maintained by the database server in association with the columns.

Structures for Cached Result Lookups

In the example given above, the SCRL of EXP3 (1−D) was a single-dimensional array, and the SCRL of EXP1 (A*(1−D)) was a two-dimensional array. However, these are merely examples of structures that may be used for cached result lookups, and the techniques described herein are not limited to any particular type of look-up structure.

For example, rather than use a two-dimensional array, a two-level look-up structure may be used as the SCRL of EXP1 (A*(1−D)). The first-level structure may be a one-dimensional array that is indexed by ACode. Each of the entries in the first-level structure may point to a corresponding second-level structure. Each of the second-level structures may be one-dimensional arrays that are indexed by DCode. Thus, to find the cached result for any code combination (ACode, DCode), Acode is used to index into the first-level array to find the entry with the pointer to the appropriate second-level array. Then DCode is used to index into that second-level array to find the entry that contains the cached result of EXP1 (A*(1−D)) for the given (ACode, DCode) combination.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
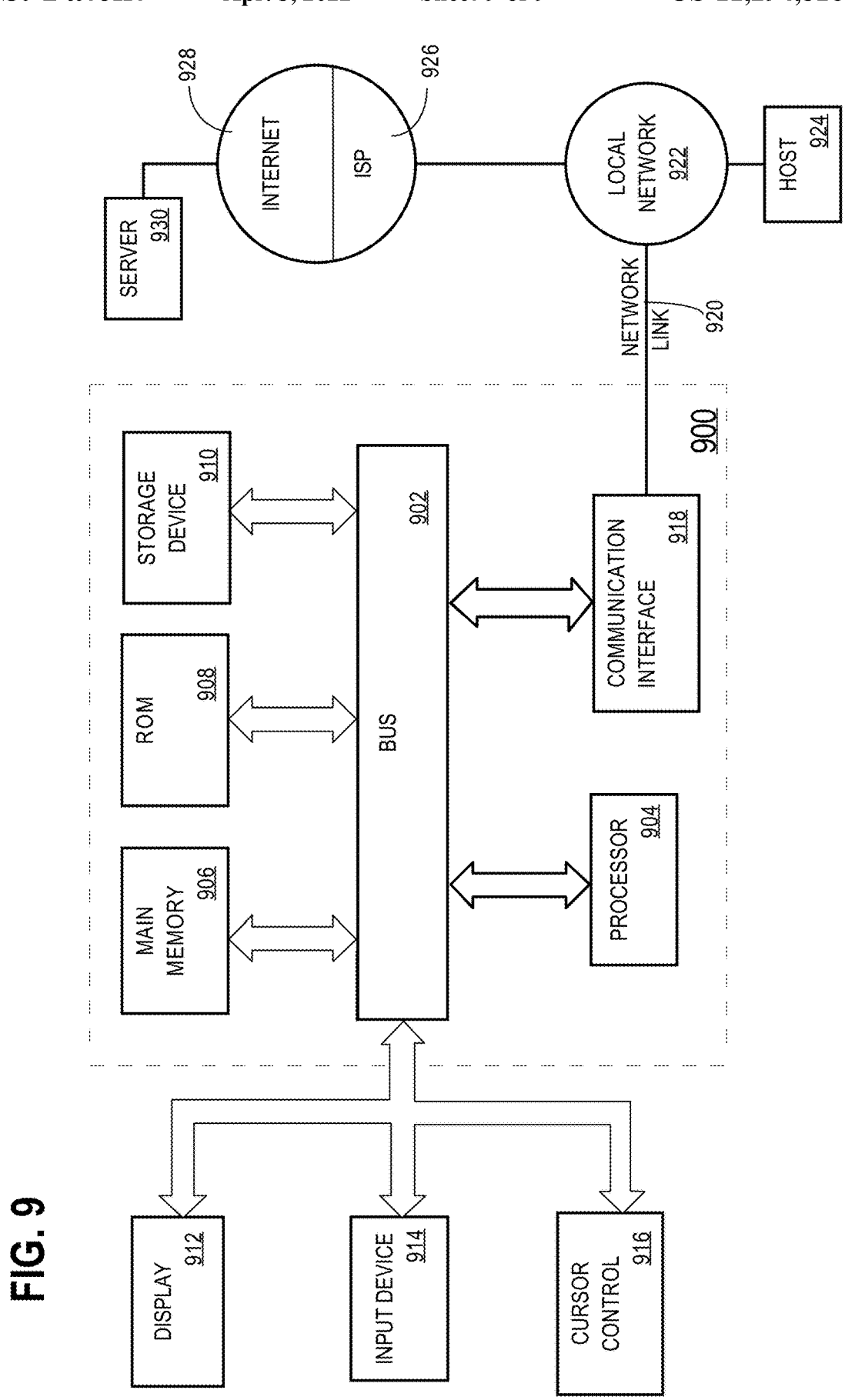
FIG. 9 is a block diagram of a computer system upon which the techniques described herein may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
maintaining a table on persistent storage;
wherein the table includes a first column;
wherein the table comprises a particular row that includes a first value for the first column;
based on a dictionary, creating, in volatile memory, a dictionary-encoded column vector that contains codes that correspond to values from a range of rows of the first column;
wherein the dictionary-encoded column vector stores a first code in a particular entry that corresponds to the particular row;
receiving a query that includes a first expression that references the first column;
creating in volatile memory, for the first expression, a data structure;
evaluating the first expression for the first code by:
reading the first code from the particular entry;
using the dictionary to determine that the first code corresponds to the first value; and
computing a first computed result of the first expression by evaluating the first expression based, at least in part, on the first value;
using the first code to index into the data structure to locate a first index entry, in the data structure, that is associated with the first code;
storing the first computed result of the first expression in the first index entry;
during execution of the query, evaluating the first expression for a second row of the table that is associated with a second entry, in the dictionary-encoded column vector, that stores a second instance of the first code by performing the steps of:
reading the second instance of the first code from the second entry, of the dictionary-encoded column vector, that corresponds to the second row of the table;
using the first code obtained from the second entry of the dictionary-encoded column vector to index into the data structure to locate the first index entry that stores the first computed result; and
reading the first computed result from the first index entry;
during execution of the query and after evaluating the first expression for the second row of the table, evaluating the first expression for a third row of the table that is associated with a third entry, in the dictionary-encoded column vector, that stores a second code, by performing the steps of:
determining that the second code represents an input for which pre-computed results have not yet been generated for the first expression;
in response to determining that the second code represents an input for which pre-computed results have not yet been generated for the first expression:
evaluating the first expression for the second code by:
using the dictionary to determine that the second code corresponds to a second value, and
computing a second computed result of the first expression by evaluating the first expression based, at least in part, on the second value; and
storing the second computed result of the first expression in a second index entry associated with the second code;
after execution of the query, returning results of the query;
wherein the method is performed by one or more computing devices.

2. The method of claim 1 wherein:
the first expression references N columns; and
the data structure is an N-dimensional array.

3. The method of claim 1 further comprising:
performing a test on each expression, of a plurality of expressions contained in the query, to determine which expressions of the plurality of expressions qualify to be cached-result expressions; and
creating the data structure in response to determining that the first expression qualifies to be a cached-result expression.

4. The method of claim 3 wherein, for the first expression, the test is based, at least in part, on cardinality of the first column for the range of rows.

5. The method of claim 3, wherein, for the first expression, the test is based, at least in part, on whether the first expression is a sub-expression that occurs more than once in the query.

6. The method of claim 3 wherein:
the first column is one of a plurality of columns referenced in the first expression; and
each column, of the plurality of columns, has a corresponding dictionary with which values of said each column have been encoded; and
for the first expression, the test is based, at least in part, on a number of all possible combinations of codes from the dictionaries that correspond to the plurality of columns.

7. The method of claim 3 wherein:
the first column is one of a plurality of columns referenced in the first expression; and
for the first expression, the test is based, at least in part, on a number of distinct input combinations, of the plurality of columns referenced in the first expression, actually present in the table for the range of rows.

8. The method of claim 3 wherein:
the first column is one of a plurality of columns referenced in the first expression;
the query has a WHERE condition; and
for the first expression, the test is based, at least in part, on a number of distinct input combinations, for the first expression, present in the actual rows, within the range of rows, that satisfy the WHERE condition.

9. The method of claim 1 wherein the first expression references a second column of the table that has a corresponding column vector that is not dictionary encoded.

10. The method of claim 1 wherein the first expression references a second column of the table that is not mirrored in volatile memory.

11. A method comprising:
maintaining a table on persistent storage;
wherein the table includes a first column;
wherein the table comprises a particular row that includes a first value for the first column;
based on a dictionary, creating, in volatile memory, a dictionary-encoded column vector that contains codes that correspond to values from a range of rows of the first column;
wherein the dictionary-encoded column vector stores a first code in a particular entry that corresponds to the particular row;

receiving a query that includes a first expression that references the first column;

creating in volatile memory, for the first expression, a first structure;

evaluating the first expression for the first code by:
  using the dictionary to determine that the first code in the particular entry corresponds to the first value; and
  computing a first computed result of the first expression by evaluating the first expression based, at least in part, on the first value;

using the first code to index into the first structure to locate a first index entry, in the first structure, that is associated with the first code;

storing the first computed result of the first expression in the first index entry;

during execution of the query, evaluating the first expression for a second row of the table that is associated with a second entry, in the dictionary-encoded column vector, that stores a second instance of the first code by performing the steps of:
  reading the second instance of the first code from the second entry, of the dictionary-encoded column vector, that corresponds to the second row of the table,
  using the first code obtained from the second entry of the dictionary-encoded column vector to index into the first structure to locate the first index entry that stores the first computed result, and
  reading the first computed result from the first index entry;

wherein the first expression is a subexpression of a second expression of the query;

creating in volatile memory, for the second expression, a second structure;

evaluating the second expression for the first code and one or more input values by:
  using the first code to index into the first structure to locate the first index entry; and
  reading the first computed result from the first index entry in the first structure; and
  computing a second computed result of the second expression by evaluating the second expression based, at least in part, on the first computed result and the one or more input values;

using the first code to index into the second structure to locate a second-structure entry, in the second structure, that is associated with the first code;

storing the second computed result of the second expression in the second-structure entry; and during execution of the query, evaluating the second expression by looking up cached results from the second structure;

after execution of the query, returning results of the query;

wherein the method is performed by one or more computing devices.

12. The method of claim 11 wherein storing the first computed result in the first structure is performed as part of pre-population of the first structure prior to execution of the query.

13. One or more non-transitory computer-readable media storing instructions that, when executed by one or more processors, cause:
  maintaining a table on persistent storage;
  wherein the table includes a first column;
  wherein the table comprises a particular row that includes a first value for the first column;
  based on a dictionary, creating, in volatile memory, a dictionary-encoded column vector that contains codes that correspond to values from a range of rows of the first column;
  wherein the dictionary-encoded column vector stores a first code in a particular entry that corresponds to the particular row;
  receiving a query that includes a first expression that references the first column;
  creating in volatile memory, for the first expression, a data structure;
  evaluating the first expression for the first code by:
    reading the first code from the particular entry;
    using the dictionary to determine that the first code corresponds to the first value; and
    computing a first computed result of the first expression by evaluating the first expression based, at least in part, on the first value;
  using the first code to index into the data structure to locate a first index entry, in the data structure, that is associated with the first code;
  storing the first computed result of the first expression in the first index entry;
  during execution of the query, evaluating the first expression for a second row of the table that is associated with a second entry, in the dictionary-encoded column vector, that stores a second instance of the first code by performing the steps of:
    reading the second instance of the first code from the second entry, of the dictionary-encoded column vector, that corresponds to the second row of the table;
    using the first code obtained from the second entry of the dictionary-encoded column vector to index into the data structure to locate the first index entry that stores the first computed result; and
    reading the first computed result from the first index entry;
  during execution of the query and after evaluating the first expression for the second row of the table, evaluating the first expression for a third row of the table that is associated with a third entry, in the dictionary-encoded column vector, that stores a second code, by performing the steps of:
    determining that the second code represents an input for which pre-computed results have not yet been generated for the first expression;
    in response to determining that the second code represents an input for which pre-computed results have not yet been generated for the first expression:
      evaluating the first expression for the second code by:
        using the dictionary to determine that the second code corresponds to a second value, and
        computing a second computed result of the first expression by evaluating the first expression based, at least in part, on the second value; and
      storing the second computed result of the first expression in a second index entry associated with the second code;
  after execution of the query, returning results of the query.

14. The one or more non-transitory computer-readable media of claim 13 wherein:
  the first expression references N columns; and
  the data structure is an N-dimensional array.

15. The one or more non-transitory computer-readable media of claim 13 wherein the instructions further comprise instructions that, when executed by one or more processors, cause:
> performing a test on each expression, of a plurality of expressions contained in the query, to determine which expressions of the plurality of expressions qualify to be cached-result expressions; and
> creating the data structure in response to determining that the first expression qualifies to be a cached-result expression.

16. The one or more non-transitory computer-readable media of claim 15 wherein, for the first expression, the test is based, at least in part, on cardinality of the first column for the range of rows.

17. The one or more non-transitory computer-readable media of claim 15 wherein, for the first expression, the test is based, at least in part, on whether the first expression is a sub-expression that occurs more than once in the query.

18. The one or more non-transitory computer-readable media of claim 15 wherein:
> the first column is one of a plurality of columns referenced in the first expression; and
> each column, of the plurality of columns, has a corresponding dictionary with which values of said each column have been encoded; and
> for the first expression, the test is based, at least in part, on a number of all possible combinations of codes from the dictionaries that correspond to the plurality of columns.

19. The one or more non-transitory computer-readable media of claim 15 wherein:
> the first column is one of a plurality of columns referenced in the first expression; and
> for the first expression, the test is based, at least in part, on a number of distinct input combinations, of the plurality of columns referenced in the first expression, actually present in the table for the range of rows.

20. The one or more non-transitory computer-readable media of claim 15 wherein:
> the first column is one of a plurality of columns referenced in the first expression;
> the query has a WHERE condition; and
> for the first expression, the test is based, at least in part, on a number of distinct input combinations, for the first expression, present in the actual rows, within the range of rows, that satisfy the WHERE condition.

21. The one or more non-transitory computer-readable media of claim 13 wherein the first expression references a second column of the table that has a corresponding column vector that is not dictionary encoded.

22. The one or more non-transitory computer-readable media of claim 13 wherein the first expression references a second column of the table that is not mirrored in volatile memory.

23. One or more non-transitory computer-readable media storing instructions that, when executed by one or more processors, cause:
> maintaining a table on persistent storage;
> wherein the table includes a first column;
> wherein the table comprises a particular row that includes a first value for the first column;
> based on a dictionary, creating, in volatile memory, a dictionary-encoded column vector that contains codes that correspond to values from a range of rows of the first column;
> wherein the dictionary-encoded column vector stores a first code in a particular entry that corresponds to the particular row;
> receiving a query that includes a first expression that references the first column;
> creating in volatile memory, for the first expression, a first structure;
> evaluating the first expression for the first code by:
>> using the dictionary to determine that the first code corresponds to the first value; and
>> computing a first computed result of the first expression by evaluating the first expression based, at least in part, on the first value;
> using the first code to index into the first structure to locate a first index entry, in the first structure, that is associated with the first code;
> storing the first computed result of the first expression in the first index entry;
> during execution of the query, evaluating the first expression for a second row of the table that is associated with a second entry, in the dictionary-encoded column vector, that stores a second instance of the first code by performing the steps of:
>> reading the second instance of the first code from the second entry, of the dictionary-encoded column vector, that corresponds to the second row of the table,
>> using the first code obtained from the second entry of the dictionary-encoded column vector to index into the first structure to locate the first index entry that stores the first computed result, and
>> reading the first computed result from the first index entry;
> wherein the first expression is a subexpression of a second expression of the query; and
> creating in volatile memory, for the second expression, a second structure;
> evaluating the second expression for the first code and one or more input values by:
>> using the first code to index into the first structure to locate the first index entry; and
>> reading the first computed result from the first index entry in the first structure; and
>> computing a second computed result of the second expression by evaluating the second expression based, at least in part, on the first computed result and the one or more input values;
> using the first code to index into the second structure to locate a second-structure entry, in the second structure, that is associated with the first code;
> storing the second computed result of the second expression in the second-structure entry; and
> during execution of the query, evaluating the second expression by looking up cached results from the second structure;
> after execution of the query, returning results of the query.

24. The one or more non-transitory computer-readable media of claim 23 wherein storing the first computed result in the first structure is performed as part of pre-population of the first structure prior to execution of the query.

* * * * *

UNITED STATES PATENT AND TRADEMARK OFFICE
CERTIFICATE OF CORRECTION

PATENT NO. : 11,294,816 B2
APPLICATION NO. : 15/397714
DATED : April 5, 2022
INVENTOR(S) : Chavan et al.

Page 1 of 1

It is certified that error appears in the above-identified patent and that said Letters Patent is hereby corrected as shown below:

In the Specification

In Column 11, Line 53, delete "readers" and insert -- readers. --, therefor.

In Column 16, Line 46, delete "Bcode" and insert -- BCode --, therefor.

In Column 16, Line 58, delete "(ACode,BCode)." and insert -- (ACode, BCode). --, therefor.

In Column 18, Line 13, delete "be be" and insert -- be --, therefor.

In Column 26, Line 36, delete "Acode" and insert -- ACode --, therefor.

Signed and Sealed this
Twenty-third Day of August, 2022

Katherine Kelly Vidal
*Director of the United States Patent and Trademark Office*